(12) United States Patent
Luh

(10) Patent No.: US 7,083,018 B2
(45) Date of Patent: Aug. 1, 2006

(54) ELECTRIC MOTOR HAVING SUSPENSION MECHANISM

(75) Inventor: Tai Yang Luh, Taichung (TW)

(73) Assignee: Ding Li Metal Industrial Co., Ltd., Taipen (TW)

( * ) Notice: Subject to any disclaimer, the term of this patent is extended or adjusted under 35 U.S.C. 154(b) by 264 days.

(21) Appl. No.: 10/746,309

(22) Filed: Dec. 26, 2003

(65) Prior Publication Data

US 2005/0145431 A1    Jul. 7, 2005

(51) Int. Cl.
*B60K 1/00* (2006.01)

(52) U.S. Cl. .................. 180/65.1; 180/208; 180/299

(58) Field of Classification Search ............... 180/65.1, 180/291, 299, 300, 902, 228, 908, 208
See application file for complete search history.

(56) References Cited

U.S. PATENT DOCUMENTS

| | | | |
|---|---|---|---|
| 5,941,327 A * | 8/1999 | Wu | 180/65.1 |
| 6,056,077 A * | 5/2000 | Kobayashi | 180/216 |
| 6,336,517 B1 * | 1/2002 | Cheng | 180/208 |
| 6,439,331 B1 * | 8/2002 | Fan | 180/208 |
| 6,581,713 B1 * | 6/2003 | Fu et al. | 180/291 |
| 6,655,717 B1 * | 12/2003 | Wang | 280/781 |
| 6,896,084 B1 * | 5/2005 | Lo | 180/208 |
| 2003/0062703 A1 * | 4/2003 | Lin | 280/124.125 |
| 2004/0135334 A1 * | 7/2004 | Cheng | 280/87.03 |

* cited by examiner

*Primary Examiner*—Jeff Restifo
(74) *Attorney, Agent, or Firm*—Charles E. Baxley

(57) ABSTRACT

An electric motor includes a chassis having a front tube to rotatably support a handle, two arms each having one end pivotally attached to the chassis to support two front wheels on the outer ends. A cushioning device may be used to cushion the front wheels and the arms relative to the chassis. A carrier is pivotally attached to the rear portion of the chassis, and includes a spindle to support two rear wheels. An electric motor device is attached to the carrier to drive the rear wheels. Another cushioning device may be used to cushion the rear wheels and the carrier relative to the chassis.

9 Claims, 10 Drawing Sheets

ELECTRIC MOTOR HAVING SUSPENSION MECHANISM

BACKGROUND OF THE INVENTION

1. Field of the Invention

The present invention relates to an electric motor, and more particularly to an electric motor having a suspension mechanism for resiliently suspending or cushioning the electric motor.

2. Description of the Prior Art

Various kinds of typical electric motors have been developed and comprise four wheels directly attached to a vehicle frame body without any suspension mechanisms, such that the electric motor may not be suitably or resiliently suspended or cushioned relative to the wheels, and such that the users may not comfortably drive or ride the typical electric motors.

The present invention has arisen to mitigate and/or obviate the afore-described disadvantages of the conventional electric motors.

SUMMARY OF THE INVENTION

The primary objective of the present invention is to provide an electric motor including a suspension mechanism for resiliently suspending or cushioning the electric motor, and for allowing the users to comfortably drive or ride the electric motors.

In accordance with one aspect of the invention, there is provided an electric motor comprising a chassis including a front portion and a rear portion, a front tube secured to the front portion of the chassis, to rotatably support a handle thereon, two arms each including a first end pivotally attached to the front portion of the chassis, and each including a second end, two front wheels attached to the second ends of the arms respectively, a first cushioning means for cushioning the front wheels and the arms relative to the chassis, a carrier pivotally attached to the rear portion of the chassis, and including a spindle attached thereto, two rear wheels attached to the spindle, an electric motor device attached to the carrier to drive the rear wheels, and a second cushioning means for cushioning the rear wheels and the carrier relative to the chassis.

The chassis includes a base attached thereon to support the front tube. The first cushioning means includes two cushioning devices secured between the arms and the front tube respectively, to cushion the arms relative to the chassis. The chassis includes a frame attached to the front tube, the cushioning devices secured to the frame respectively.

Each of the arms includes a bracket attached to the second end thereof and having a wheel axle extended therefrom to support the front wheels thereon respectively. One or more links may couple the brackets of the arms to the handle, for allowing the handle to rotate the brackets of the arms relative to the chassis with the handle by the users.

The chassis includes at least one stay provided on the rear portion thereof, the carrier includes a front portion pivotally attached to the stay of the chassis with a pivot shaft. The chassis includes a conduit secured to the stay, and a seat attached to the conduit. The second cushioning means includes a cushioning device secured between the conduit and the carrier, to suspend and cushion the carrier relative to the chassis.

An electromagnetic brake device may further be provided and attached to the electric motor device, and includes a bar coupled to the electromagnetic brake device, and a brake lever coupled to the bar, for operating the electromagnetic brake device.

The chassis includes a cover attached to the rear portion thereof, the brake lever includes a lower portion coupled to the bar, and includes a knob attached thereon and extended outwardly through the cover, for being operated by users.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
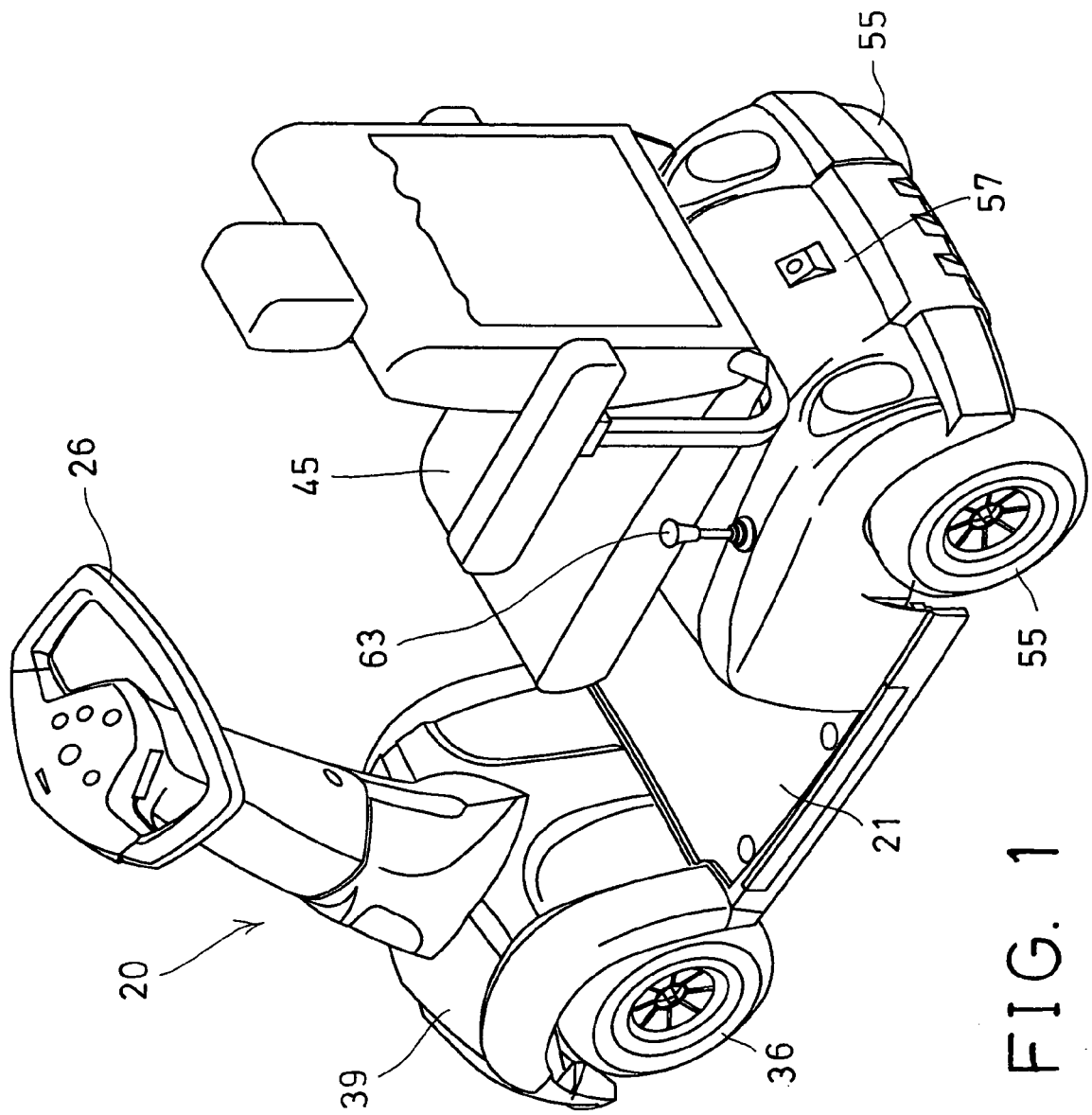
FIG. 1 is a perspective view of an electric motor in accordance with the present invention.
Figure 2:
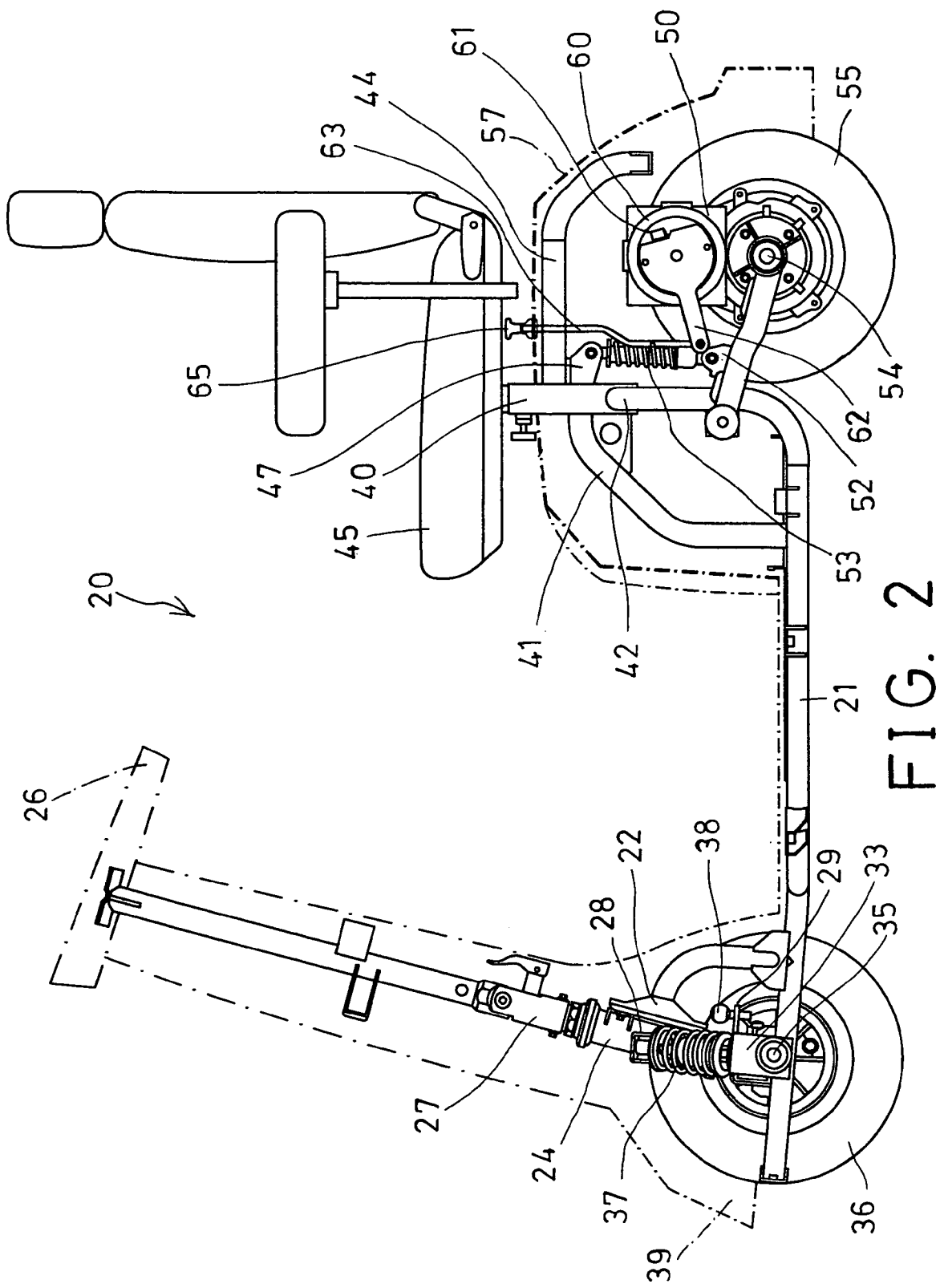
FIG. 2 is a side schematic view of the electric motor.
Figure 3:
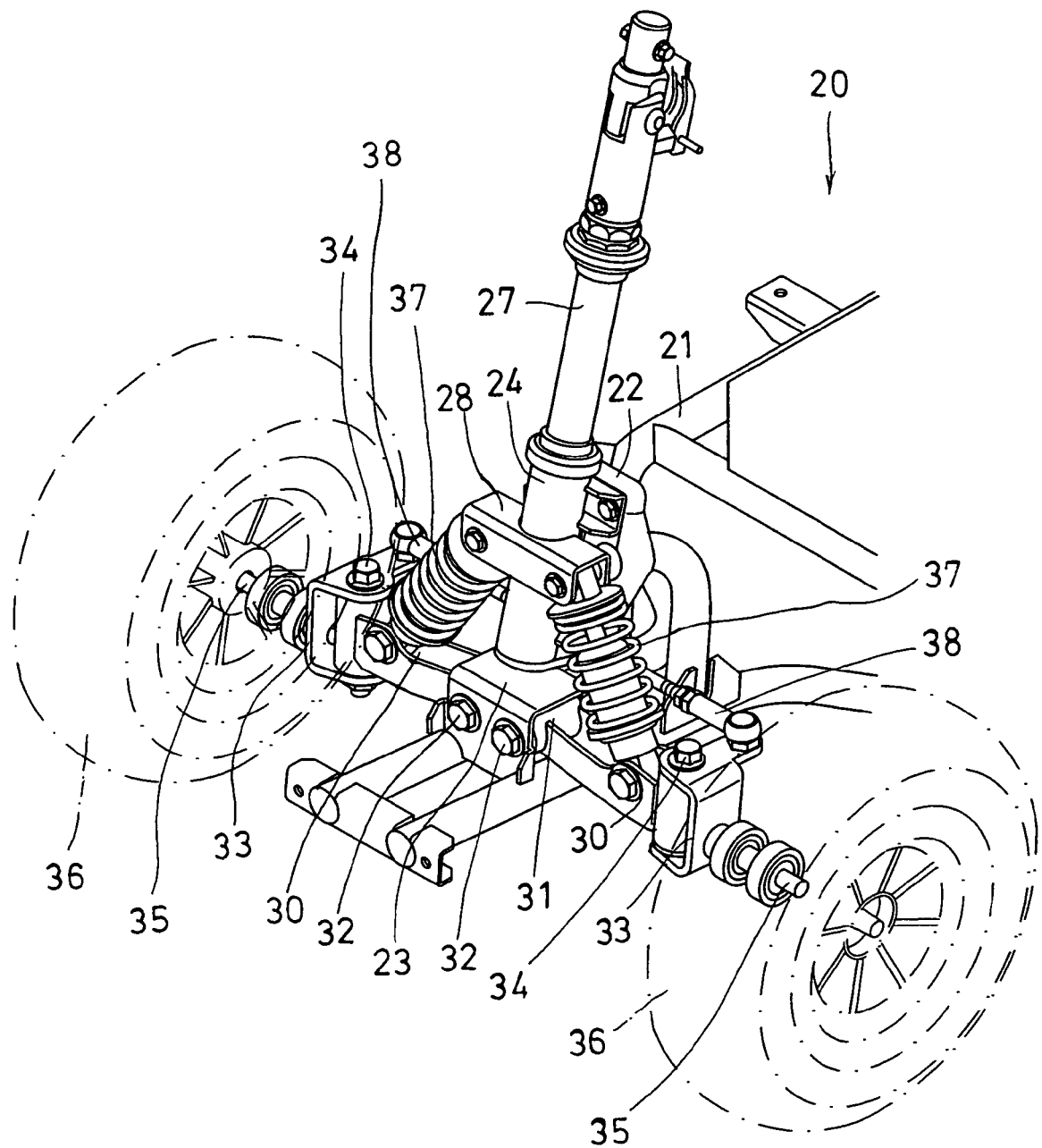
FIG. 3 is a partial front perspective view of the electric motor.

Referring to the drawings, and initially to FIGS. 1 and 2, an electric motor 20 in accordance with the present invention comprises a chassis 21 including a base 22 and a bracket 23 attached or provided on the front portion thereof. A front tube 24 is secured to the base 22 with such as fasteners 25, for rotatably supporting a steering wheel or a handle 26 thereon with a handlebar stem 27, for steering purposes. The chassis 21 includes another bracket or a frame 28 attached thereto, such as attached to the front tube 24.

Two arms 30 each includes one end 31 rotatably or pivotally secured to the bracket 23 with such as a fastener 32, and a bracket 33 rotatably or pivotally secured to the other end thereof with a pivot pin 34. Each of the brackets 33 includes a wheel axle 35 extended therefrom for supporting a front wheel 36 thereon. One or more, such as two cushioning devices 37 are secured between the arms 30 and the frame 28 of the front tube 24 respectively, for suspending or cushioning the arms 30 relative to the chassis 21.

Figure 4:
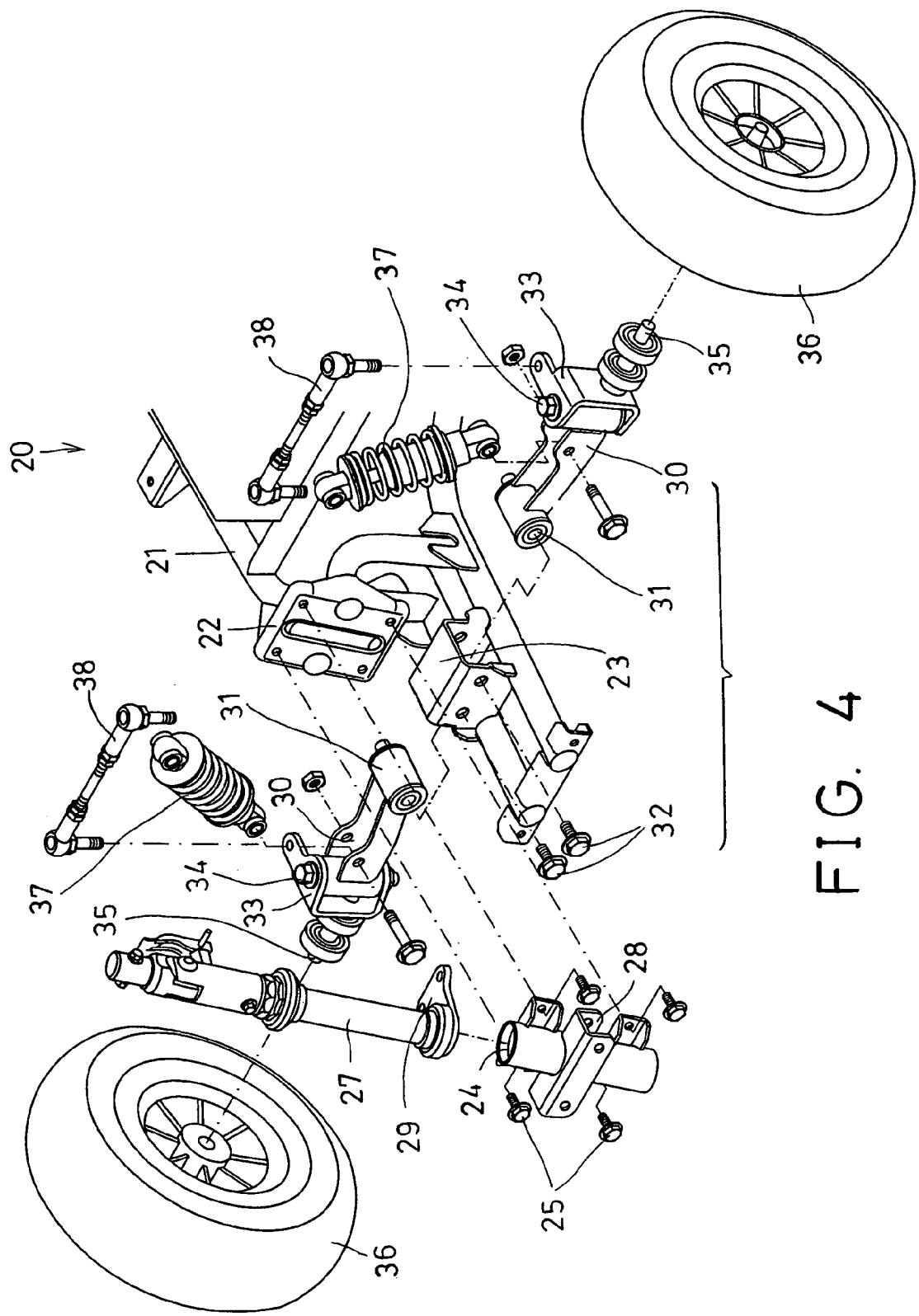
FIG. 4 is a partial exploded view illustrating the front portion of the electric motor.

One or more, such as two links 38 are coupled between the arms 30 or the brackets 33 and an extension 29 of the handlebar stem 27 respectively (FIGS. 2, 4), for allowing the brackets 33 and thus the front wheels 36 to be rotated relative to the arms 30 by the handlebar stem 27 and the handle 26, in order to control or maneuver the electric motor 20. A cap 39 may be attached to the front portion of the chassis 21, in order to cover or shield the cushioning devices 37 and the other elements or members.

Figure 5:
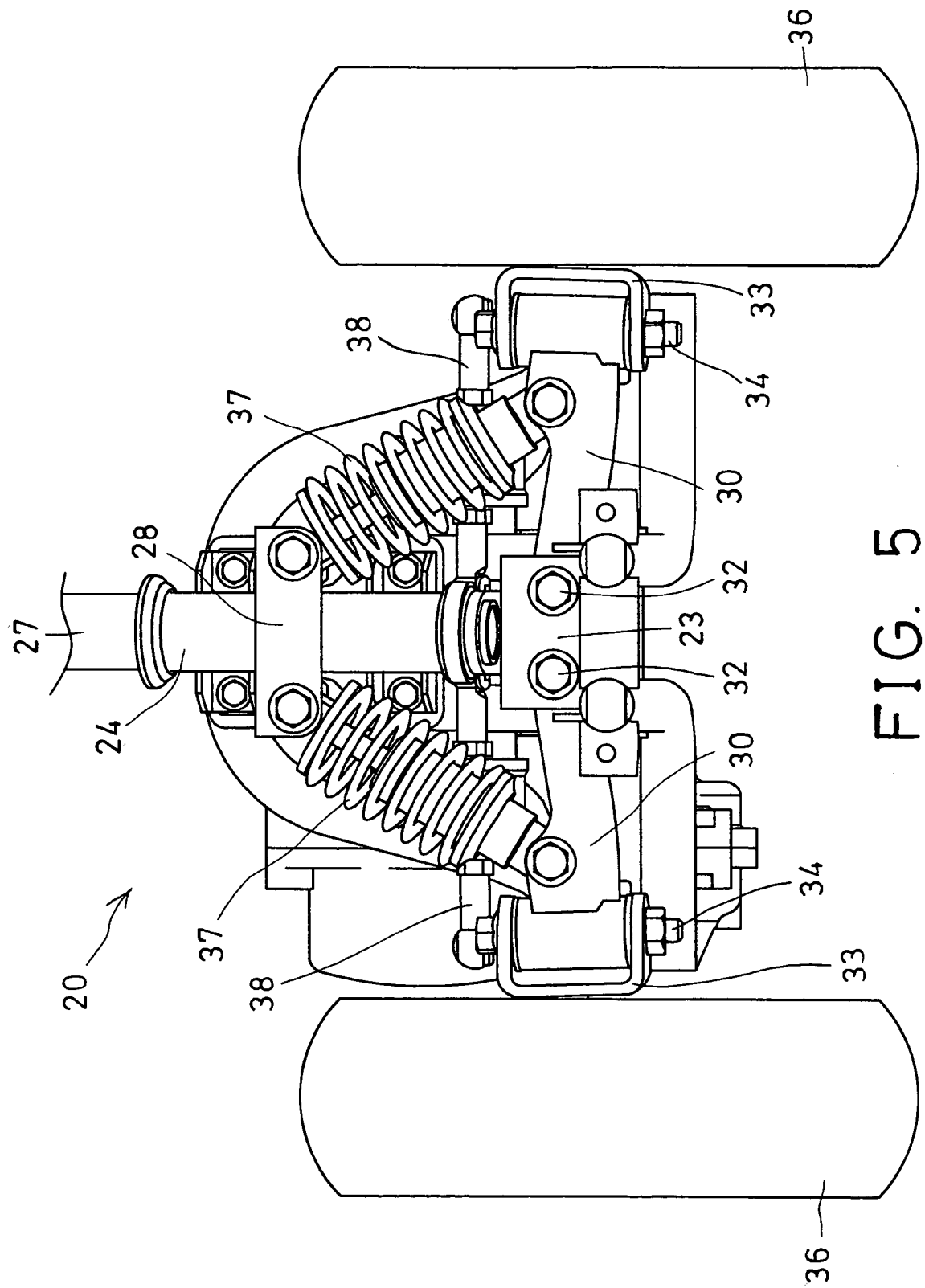
FIG. 5 is a partial front plan view of the electric motor.
Figure 6:
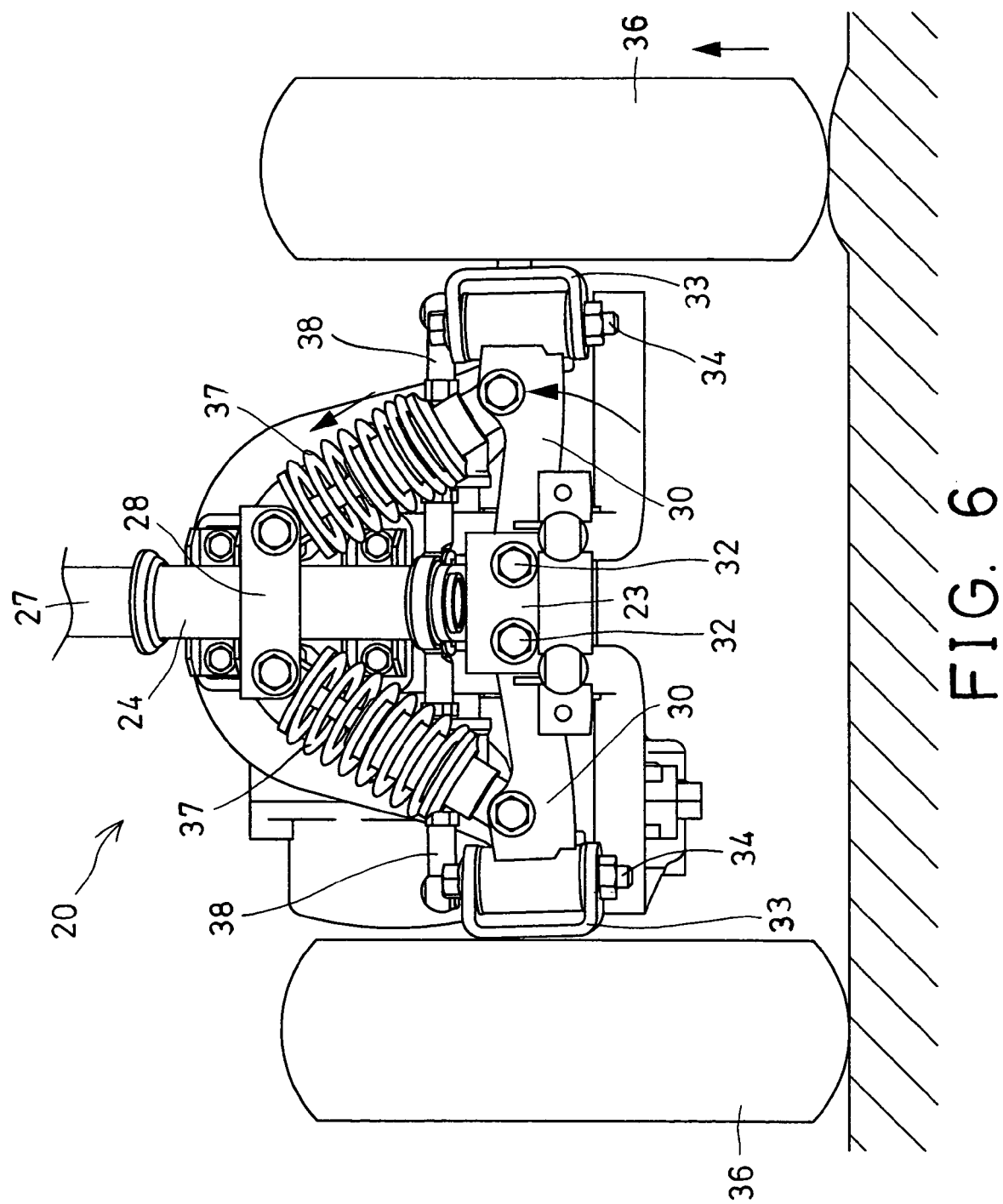
FIG. 6 is a partial front plan view similar to FIG. 5, illustrating the operation of the electric motor.

As shown in FIGS. 5 and 6, the front portion of the chassis 21 of the electric motor 20 may thus be resiliently suspended or cushioned relative to the front wheels 26 with the cushioning devices 37, and the users may thus comfortably drive or ride the electric motor 20. The cushioning devices 37 may be selected from spring members, actuators, such as pneumatic or hydraulic cylinders, etc.

Figure 7:
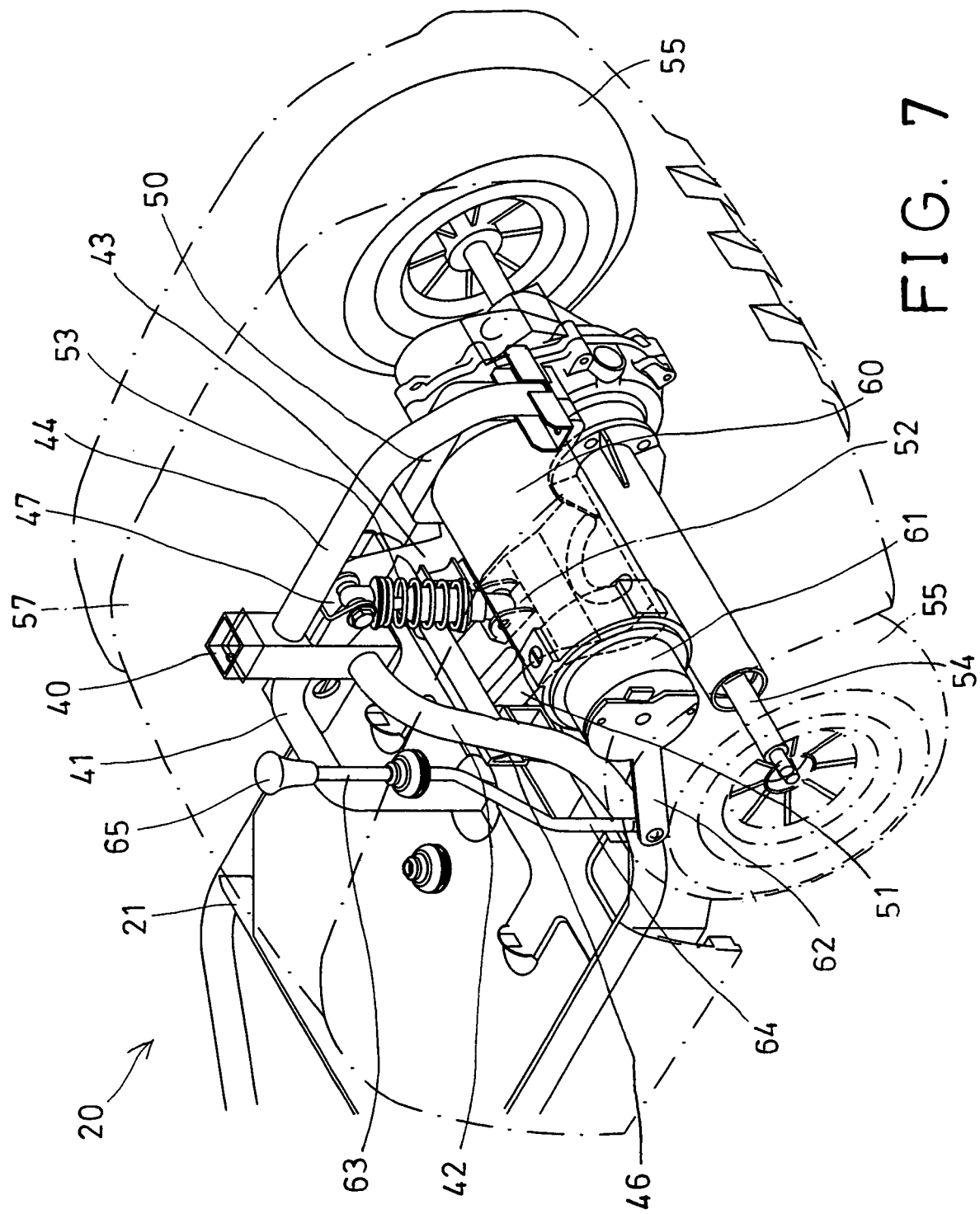
FIG. 7 is a partial rear perspective view of the electric motor.
Figure 8:
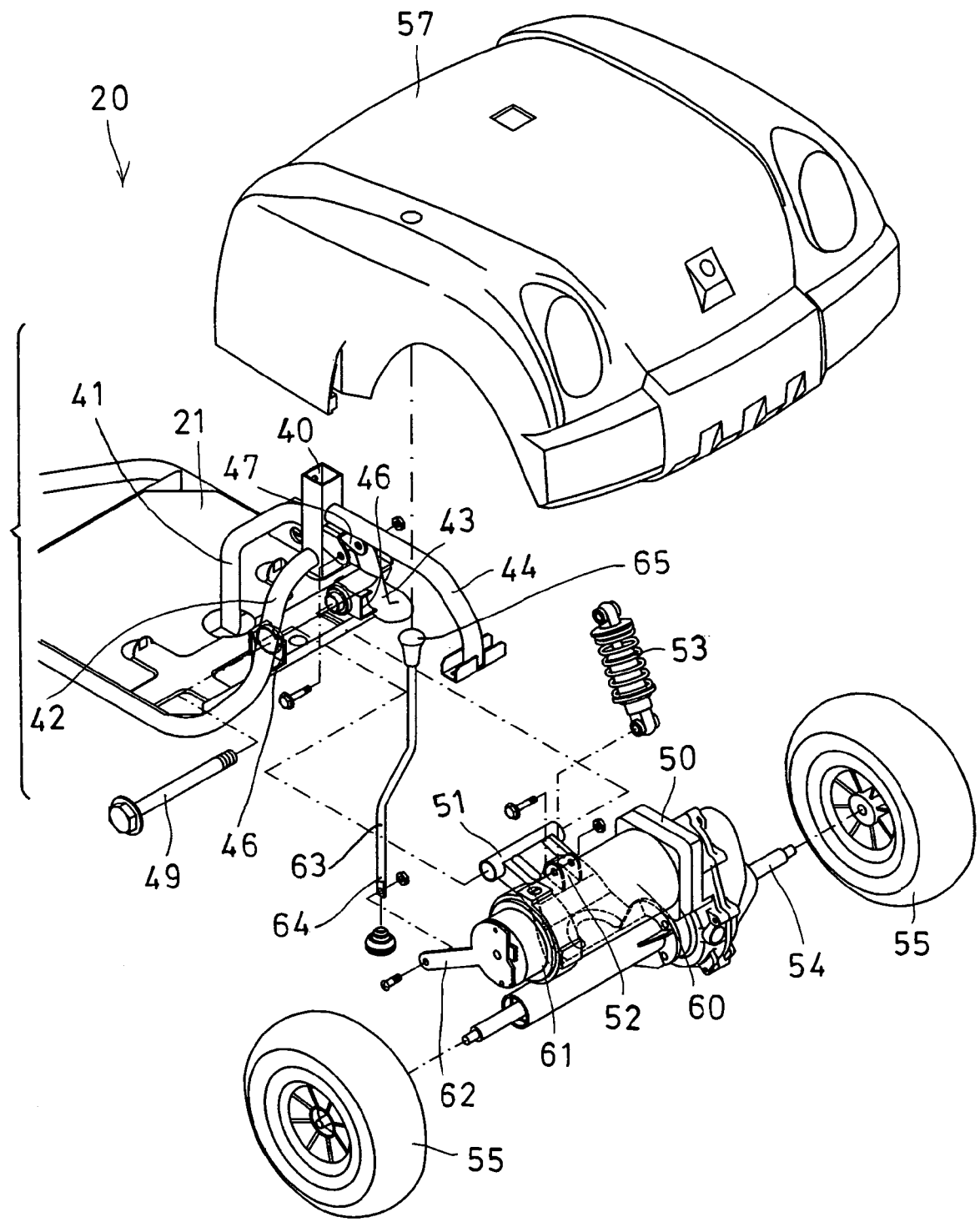
FIG. 8 is a partial exploded view illustrating the rear portion of the electric motor.
Figure 9:
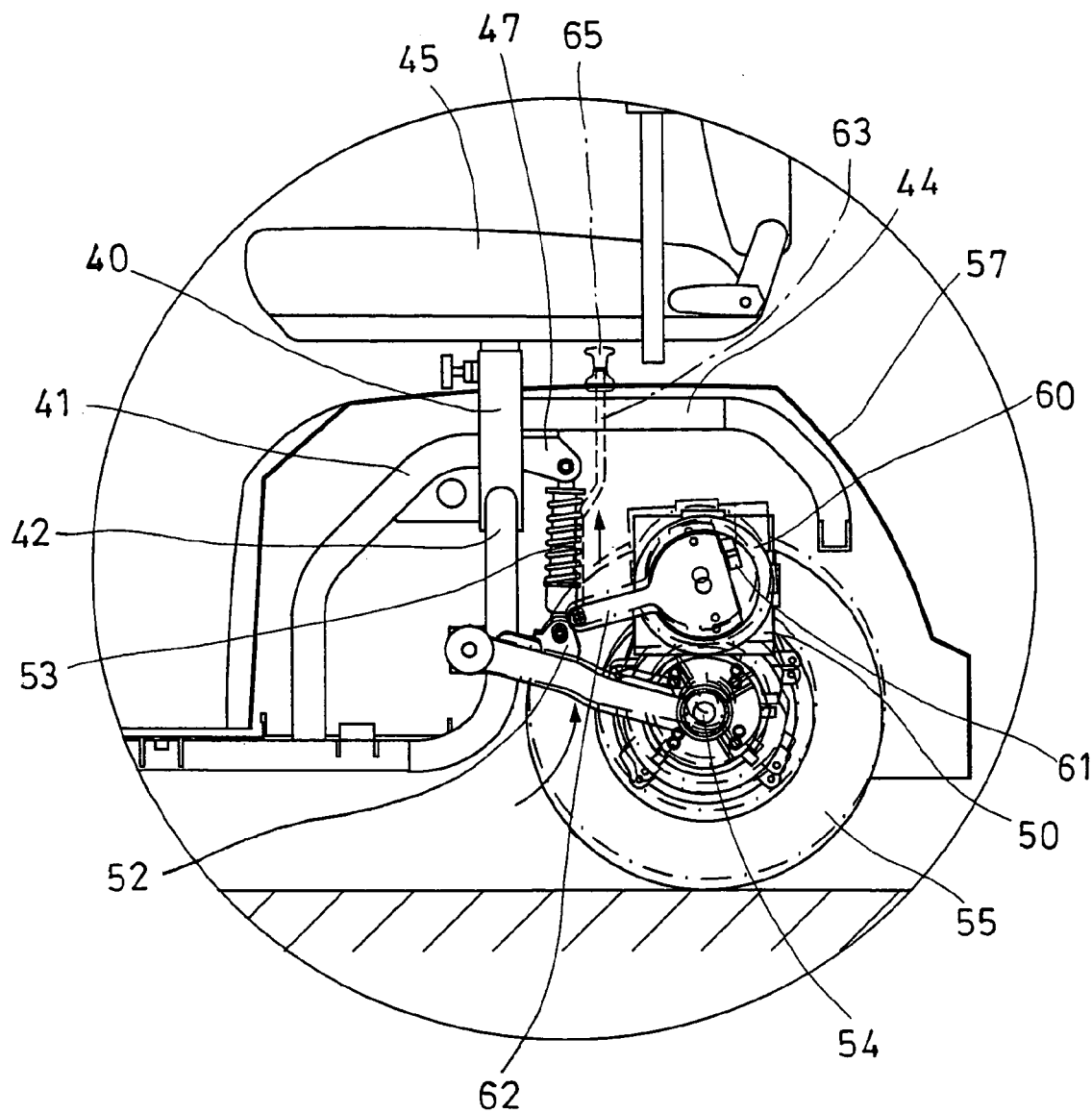
FIG. 9 is an enlarged partial side view, illustrating the operation of the electric motor.
Figure 10:
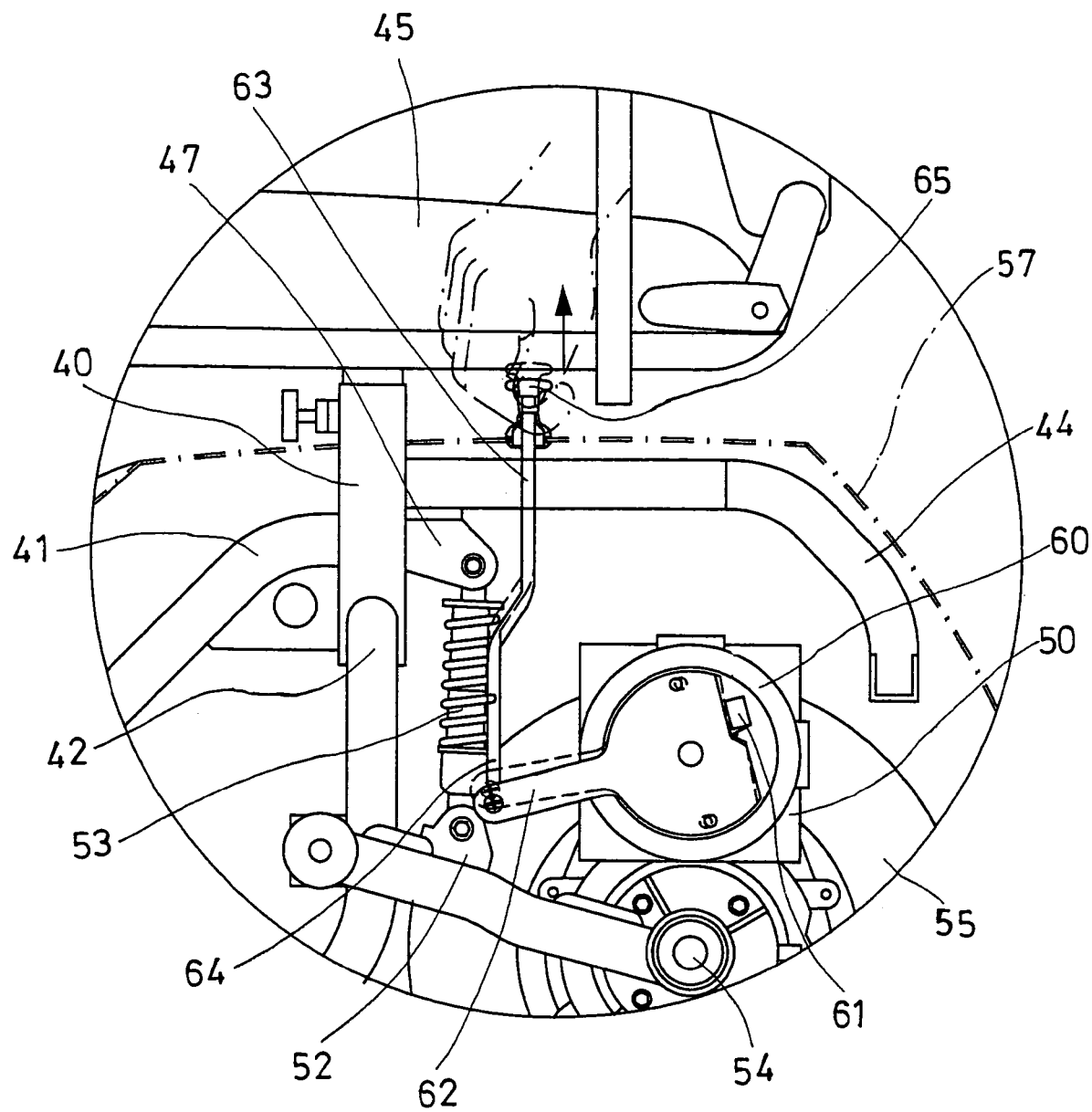
FIG. 10 is an enlarged partial side view similar to FIG. 9, illustrating the operation of the electric motor.

Referring next to FIGS. 7–9, the chassis 21 includes a conduit 40 attached to the rear portion thereof with one or more, such as three stays 41–43, for supporting a seat 45 thereon. A beam 44 is secured to the conduit 40 or extended rearwardly from the conduit 40. The chassis 21 further includes one or more, such as two brackets 46 attached thereto, such as attached to the stays 42, 43 respectively, and another bracket 47 attached to such as the conduit 40.

A carrier 50 includes a front portion 51 rotatably or pivotally secured to the chassis 21, such as secured between the stays 42, 43 or the brackets 46 with a pivot shaft 49 (FIG. 8), for allowing the carrier 50 to be rotated or pivoted relative to the chassis 21. The carrier 50 includes a further bracket 52 attached thereto. One or more cushioning devices 53 are secured between the chassis 21 and the carrier 50, for suspending or cushioning the carrier 50 relative to the chassis 21 (FIG. 9).

The carrier 50 includes a spindle 54 attached thereto for rotatably supporting one or more, such as two rear wheels 55 thereto. The rear wheels 55 may thus be suspended or cushioned relative to the chassis 21 with the carrier 50 and the cushioning devices 53. The cushioning devices 53 may also be selected from spring members, actuators, such as pneumatic or hydraulic cylinders, etc. A cover 57 may be attached to the rear portion of the chassis 21, or attached to the carrier 50 in order to cover or shield the cushioning devices 53 and the other elements or members.

An electric motor device 60 is attached to the carrier 50, for providing driving power to drive the rear wheels 55 of the electric motor 20, and includes an electromagnetic brake device 61 attached thereto. A bar 62 is coupled to the electromagnetic brake device 61, for actuating or operating the electromagnetic brake device 61. A brake lever 63 includes a lower portion 64 attached or coupled to the bar 62, and includes a knob 65 attached to the upper portion thereof and extended upwardly or outwardly through the cover 57, for being actuated or operated by the users or drivers, to brake the electric motor 20.

Accordingly, the electric motor in accordance with the present invention includes a suspension mechanism for resiliently suspending or cushioning the electric motor, and for allowing the users to comfortably drive or ride the electric motors.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An electric motor comprising:
   a chassis including a front portion and a rear portion,
   a front tube secured to said front portion of said chassis, to rotatably support a handle thereon,
   two arms each including a first end pivotally attached to said front portion of said chassis, and each including a second end,
   two front wheels attached to said second ends of said arms respectively,
   a first cushioning means for cushioning said front wheels and said arms relative to said chassis,
   a carrier pivotally attached to said rear portion of said chassis, and including a spindle attached thereto,
   two rear wheels attached to said spindle,
   an electric motor device attached to said carrier to drive said rear wheels,
   a second cushioning means for cushioning said rear wheels and said carrier relative to said chassis,
   an electromagnetic brake device attached to said electric motor device,
   a bar coupled to said electromagnetic brake device,
   a brake lever including a lower portion coupled to said bar, for operating said brake device, and
   a cover attached to said rear portion of said chassis, and said brake lever including a knob attached thereon and extended outwardly through said cover, for being operated by users.

2. The electric motor as claimed in claim 1, wherein said chassis includes a base attached thereon to support said front tube.

3. The electric motor as claimed in claim 1, wherein said first cushioning means includes two cushioning devices secured between said arms and said front tube respectively, to cushion said arms relative to said chassis.

4. The electric motor as claimed in claim 3, wherein said chassis includes a frame attached to said front tube, said cushioning devices secured to said frame respectively.

5. The electric motor as claimed in claim 1, wherein each of said arms includes a bracket attached to said second end thereof and having a wheel axle to support said front wheels.

6. The electric motor as claimed in claim 5 further comprising at least one link coupling said brackets of said arms to said handle, for allowing said handle to rotate said brackets of said arms relative to said chassis with said handle.

7. The electric motor as claimed in claim 1, wherein said chassis includes at least one stay provided on said rear portion thereof, said carrier includes a front portion pivotally attached to said at least one stay of said chassis with a pivot shaft.

8. The electric motor as claimed in claim 7, wherein said chassis includes a conduit secured to said at least one stay, and a seat attached to said conduit.

9. The electric motor as claimed in claim 8, wherein said second cushioning means includes a cushioning device secured between said conduit and said carrier, to suspend and cushion said carrier relative to said chassis.

* * * * *